(No Model.)
T. B. NUTTING.
FIRE ESCAPE.
No. 394,502. Patented Dec. 11, 1888.
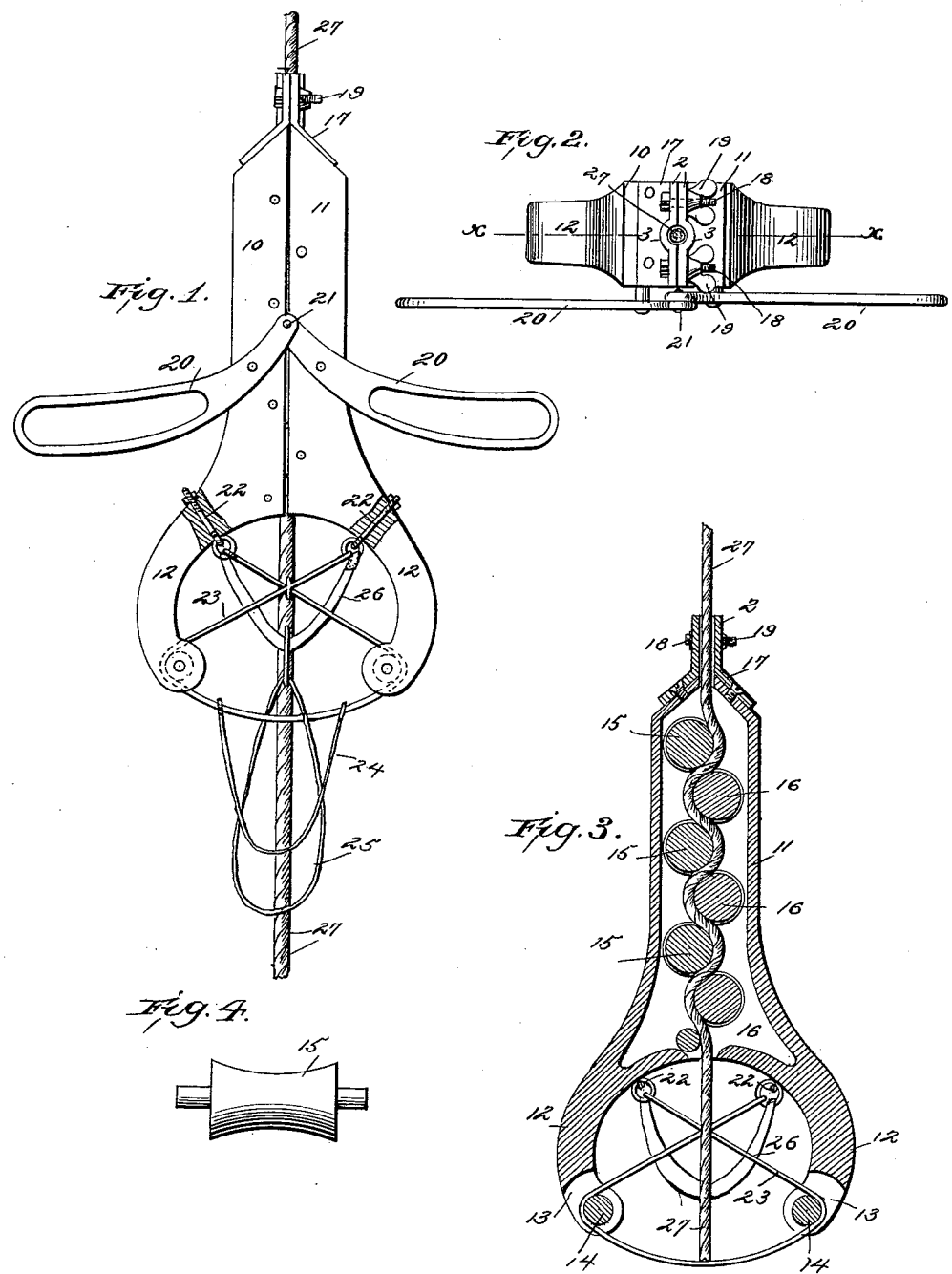
WITNESSES:
W. R. Davis
C. Sedgwick
INVENTOR:
T. B. Nutting
BY Munn & Co
ATTORNEYS.

UNITED STATES PATENT OFFICE.

THOMAS B. NUTTING, OF MORRISTOWN, NEW JERSEY, ASSIGNOR OF ONE-HALF TO THOMAS B. NUTTING, JR., OF SAME PLACE.

FIRE-ESCAPE.

SPECIFICATION forming part of Letters Patent No. 394,502, dated December 11, 1888.

Application filed April 20, 1888. Serial No. 271,282. (No model.)

*To all whom it may concern:*

Be it known that I, THOMAS B. NUTTING, of Morristown, in the county of Morris and State of New Jersey, have invented a new and Improved Fire-Escape, of which the following is a full, clear, and exact description.

This invention relates to a novel form of fire-escape wherein the parts are so arranged as to be applicable for use in connection with ropes of varying size, one of the main objects of the invention being to so arrange and construct the several parts of the fire-escape that the frictional grip upon the rope may be varied by the party using the escape, so that the speed of descent may be increased or decreased at pleasure; and to this end the invention consists, essentially, of two detachably-connected roller-cages that are each provided with a lever-arm from which the body-supporting slings are suspended, the adjusting-levers being also arranged in connection with the roller-cages, as will be hereinafter more fully described, and specifically pointed out in the claims.

Reference is to be had to the accompanying drawings, forming a part of this specification, in which similar figures of reference indicate corresponding parts in all the views.

Figure 1 is a side view of my fire-escape. Fig. 2 is a plan view of the same. Fig. 3 is a central sectional elevation taken on line $x\ x$ of Fig. 2, and Fig. 4 is a side view of one of the rollers employed in connection with the fire-escape.

In the drawings, 10 and 11 represent hollow roller-cages, that are preferably made of metal, each roller-cage being provided with a downwardly-extending curved arm, 12, the lower ends of said arms being slotted at 13 to receive sheaves 14, that are journaled within the slotted or bifurcated ends of the arms. Within the cages 10 and 11, I journal rollers 15 and 16, the rollers being formed with concave peripheral faces and mounted within their cases so as to break joint, as is clearly shown in Fig. 3.

To the upper end of each of the roller-cages I secure a casting, 17, which castings are formed with upwardly-extending flanges 2, in the center of which there is a semicircular recess, 3, the arrangement being such that when the two parts of the fire-escape are associated there will be a circular opening extending downward through the flanges 2, this uniting of the two cages being brought about by thumb-screws 18, which pass through properly-located registering apertures that are formed in the flanges 2, the bolts being engaged by winged nuts 19.

To the cages 10 and 11 I pivotally connect operating-levers 20, the approaching ends of said levers being united by a pivot pin or bolt, 21. Eyebolts 22 are passed through the arms 12, and to these bolts I connect the ends of a cord or rope, 23, which extends about the sheaves or rollers 14, as illustrated, said cord or rope 23 serving as the support for the main body-sling 24, which sling is intended to be passed about the body to rest just beneath the arms of the party using the fire-escape.

An auxiliary sling, 25, is connected to a loop, 26, which loop is in turn connected to the eye-bolts 22, and this auxiliary sling is intended for the use of women and children, serving as a seat, the body being steadied by the sling 24, which is placed about the body and just beneath the arms, as hereinbefore described.

In operation the winged nuts 19 are turned off and the suspending-rope 27 is passed between the cages 10 and 11, so that it will rest in the opening formed by the semicircular recesses 3, the bolts are then reinserted and clamped to place by their nuts, the rope 27 passing downward between the rollers 15 and 16 in a tortuous course, as indicated in Fig. 3.

In descending from a burning building the party adjusts the sling or slings, as above described, and grasps the handles of the levers 20, and being in this position the party is able to check the speed of his or her descent by simply drawing down upon the levers, thus forcing the cages 10 and 11 together and causing the rollers 15 and 16 to bind more firmly upon the rope 27, thereby increasing the frictional resistance between the rope and the rollers; but if the descent is not quick enough the speed may be increased by pressing upward upon the levers, thus throwing the cages apart.

Although I have described and shown the casting 17 as being separate pieces that are secured to the cages 10 and 11, I desire it to be distinctly understood that the upwardly-extending reversed flanges 2 might be made integral with the cages, and in general I desire it to be understood that, although specific constructions have been described, other equivalent constructions could be used without departing from the spirit of my invention.

Having thus fully described my invention, I claim as new and desire to secure by Letters Patent—

1. In a fire-escape, the combination, with roller-cages formed with downwardly-extending arms, of a cage-connecting attachment and regulating-levers pivotally connected to the cages and to each other, substantially as described.

2. In a fire-escape, the combination, with detachably-connected cages 10 and 11, formed with downwardly-extending arms 12, of rollers 15 and 16, mounted within said cages, rollers 14, carried by the arms 12, a cord, 23, passing about said rollers and connected to the arms above the rollers, and a sling carried by the cord 23, substantially as described.

3. In a fire-escape, the combination, with cages 10 and 11, having downwardly-extending arms 12, of castings formed with semicircular recesses and secured to the upper ends of the cages, bolts and nuts by which the castings are connected, levers 20, pivotally connected to the cages and to each other, sheaves or rollers 14, carried by the cage-arms, a cord, 23, passing about said sheaves or rollers and connected to eyebolts secured to the arms, a sling carried by the cord 23, and an auxiliary sling connected to the eyebolts, substantially as described.

THOMAS B. NUTTING.

Witnesses:
J. F. ACKER, Jr.,
C. SEDGWICK.